US009495596B2

(12) United States Patent
Stewart

(10) Patent No.: US 9,495,596 B2
(45) Date of Patent: Nov. 15, 2016

(54) SYSTEMS AND METHOD FOR IDENTIFYING LOCATIONS OF INFRASTRUCTURE ASSETS USING AERIAL IMAGERY

(71) Applicant: GOOGLE INC., Mountain View, CA (US)

(72) Inventor: Benjamin Peter Stewart, Marrickville NSW (AU)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/788,941

(22) Filed: Jul. 1, 2015

(65) Prior Publication Data

US 2015/0302253 A1 Oct. 22, 2015

Related U.S. Application Data

(63) Continuation of application No. 13/863,533, filed on Apr. 16, 2013, now Pat. No. 9,098,747.

(51) Int. Cl.
*G06K 9/00* (2006.01)

(52) U.S. Cl.
CPC ............................... *G06K 9/00651* (2013.01)

(58) Field of Classification Search
None
See application file for complete search history.

(56) References Cited

U.S. PATENT DOCUMENTS

| 4,906,940 | A | 3/1990 | Greene et al. |
| 7,359,555 | B2 | 4/2008 | Porikli et al. |
| 8,786,440 | B2 * | 7/2014 | Clare ...................... G01S 13/82 340/572.1 |
| 9,098,747 | B1 | 8/2015 | Stewart |
| 2003/0223615 | A1 | 12/2003 | Keaton et al. |
| 2004/0034473 | A1 | 2/2004 | Kim et al. |
| 2004/0177032 | A1 * | 9/2004 | Bradley ................. G06K 17/00 705/38 |
| 2007/0150130 | A1 * | 6/2007 | Welles ..................... B61L 17/00 701/19 |
| 2008/0109098 | A1 * | 5/2008 | Moshier ................. G06Q 10/06 700/103 |
| 2009/0024326 | A1 * | 1/2009 | Young ...................... G01V 1/00 702/5 |
| 2010/0114941 | A1 * | 5/2010 | Von Kaenel ...... G06F 17/30241 707/769 |
| 2011/0022433 | A1 * | 1/2011 | Nielsen .................. G06Q 10/06 705/7.27 |
| 2012/0257785 | A1 * | 10/2012 | Narayan ................. E21B 44/00 382/100 |

* cited by examiner

*Primary Examiner* — Hadi Akhavannik
(74) *Attorney, Agent, or Firm* — Marshall, Gerstein & Borun LLP

(57) ABSTRACT

Embodiments include a computer-implemented method for identifying locations of infrastructure assets. The method including identifying a location of a first infrastructure asset and a location of a second infrastructure asset, identifying a region of interest extending at least partially between the locations of the first and second infrastructure assets, obtaining an aerial image of the region of interest, determining that the aerial image of the region of interest comprises a third infrastructure asset, determining a location of the third infrastructure asset based at least in part on the aerial image, and storing the location of the secondary infrastructure asset in an infrastructure asset datastore.

14 Claims, 6 Drawing Sheets

SYSTEMS AND METHOD FOR IDENTIFYING LOCATIONS OF INFRASTRUCTURE ASSETS USING AERIAL IMAGERY

CROSS-REFERENCE TO RELATED APPLICATION

This is a continuation of U.S. patent application Ser. No. 13/863,533, entitled "Systems and Methods for Identifying Locations of Infrastructure Assets Using Aerial Imagery" and filed on Apr. 16, 2013, the disclosure of which is hereby incorporated herein by reference.

BACKGROUND OF THE INVENTION

1. Field of the Invention

Embodiments of this invention relate generally to geo-referencing industries and, more particularly, to special purpose machines, systems, methods and computer instructions for identifying infrastructure assets.

2. Description of the Related Art

Infrastructures may include transportation infrastructures (e.g., road systems, railway systems, etc.), energy infrastructures (e.g., electrical grids), communications infrastructures (e.g., telephone communication systems), natural resource transportation infrastructures (e.g., lake, rivers, aqua ducts, water pipelines, oil and gas pipelines, etc.), and so forth. Infrastructure assets may include elements of the various infrastructures, such as railways, railroad switching stations, power/telephone lines, power poles/towers, electrical switching stations, power generation facilities (e.g., power plants), telephone switching stations, pipelines, pumping stations, processing stations (e.g., processing plants), and the like. Information about the existence and location of various infrastructure assets can be useful to businesses and persons. For instance, the value of piece of real-estate may vary based on the existence of infrastructure assets nearby. In a residential area, for example, having a set of high-tension power lines, a railway, a pipeline or other infrastructure asset near a home may be undesirable and, thus, may decrease the value of the home. In a commercial area, however, having a railway, a pipeline or other infrastructure asset near a piece of real estate may be desirable for transporting goods and, thus, may increase the value of the piece of real estate.

Unfortunately, information about the existence and location of infrastructure assets is not generally available. One reason for the lack of availability of such information is the labor intensive nature of the processes for identifying and locating infrastructure assets. For example, a person may have to manually review records or physically visit locations to determine where infrastructure assets are located. Moreover, where infrastructure records are not accurate, the determined locations may be inaccurate.

SUMMARY OF THE INVENTION

Various embodiments of methods and apparatus for identifying locations of infrastructure assets using aerial imagery. In some embodiments, provided is a computer-implemented method for identifying locations of infrastructure assets. The method including identifying a location of a first infrastructure asset and a location of a second infrastructure asset, identifying a region of interest extending at least partially between the locations of the first and second infrastructure assets, obtaining an aerial image of the region of interest, determining that the aerial image of the region of interest comprises a third infrastructure asset, determining a location of the third infrastructure asset based at least in part on the aerial image, and storing the location of the third infrastructure asset in an infrastructure asset datastore.

In some embodiments, provided is one or more processors and one or more memory devices storing program instructions that are configured to be executed by the one or more processors to cause the following steps for identifying locations of infrastructure assets: identifying a location of a first infrastructure asset and a location of a second infrastructure asset, identifying a region of interest extending at least partially between the locations of the first and second infrastructure assets, obtaining an aerial image of the region of interest, determining that the aerial image of the region of interest comprises a third infrastructure asset, determining a location of the third infrastructure asset based at least in part on the aerial image, and storing the location of the third infrastructure asset in an infrastructure asset datastore.

In some embodiments, provided is a non-transitory computer readable medium comprising program instructions stored thereon that are executable by a processor to cause the following steps for identifying locations of infrastructure assets: identifying a location of a first infrastructure asset and a location of a second infrastructure asset, identifying a region of interest extending at least partially between the locations of the first and second infrastructure assets, obtaining an aerial image of the region of interest, determining that the aerial image of the region of interest comprises a third infrastructure asset, determining a location of the third infrastructure asset based at least in part on the aerial image, and storing the location of the third infrastructure asset in an infrastructure asset datastore.

DETAILED DESCRIPTION

Figure 1:
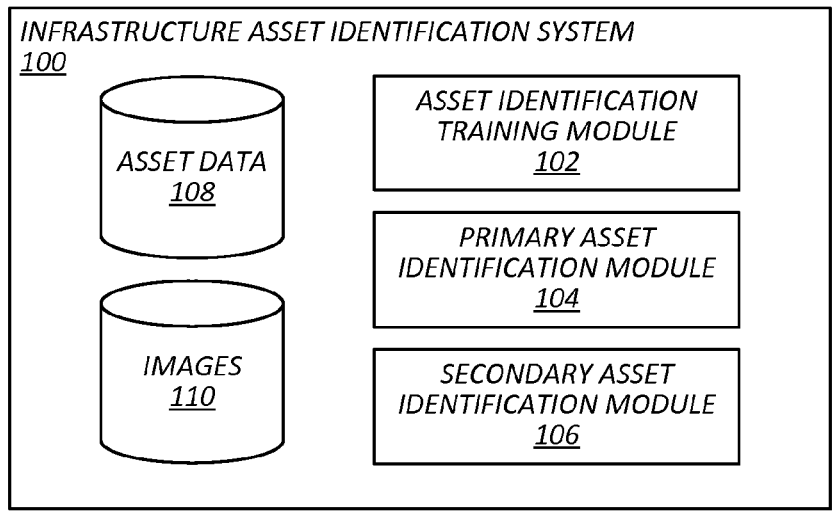
FIG. 1 is a block diagram that illustrates an infrastructure asset identification system in accordance with one or more embodiments of the present invention.

As discussed in more detail below, provided are systems and methods for identifying locations of infrastructure assets using aerial imagery. Infrastructures may provide for the production and distribution of goods and services. Infrastructures may include transportation infrastructures (e.g., railway systems, road systems, etc.), energy infrastructures (e.g., electrical grids), communications infrastructures (e.g., telephone communication systems), natural resource transportation infrastructures (e.g., lake, rivers, aqua ducts, water pipelines, oil and gas pipelines, etc.), and so forth. Infrastructure assets may include elements of the various infrastructures. Railway system infrastructure assets may include, for example, railways (e.g., rail-road tracks), rail-road switching stations, and the like. Road system infrastructure assets may include, for example, roads, intersections, and the like. Electrical grid infrastructure assets may include, for example, power lines (e.g., high-tension power lines), power poles/towers supporting power lines, electrical switching stations, power generation facilities (e.g., power plants), and the like. Telephone communication system infrastructure assets may include, for example, telephone lines, telephone poles/towers supporting phone lines, cellular phone towers, telephone switching stations, and the like. Pipeline system infrastructure assets may include pipelines, pumping stations, processing stations (e.g., processing plants), and the like. In some instances, an infrastructure may include terminal assets and connecting assets. Terminal assets may include, for example, railroad switching stations, intersections, pole/towers supporting power lines, electrical switching stations, telephone switching stations, power generation facilities, pumping stations, processing stations, etc. Connecting assets may include assets that extend between terminal assets, such as railways, roads, power/telephone lines, pipelines, etc. Terminal assets may be referred to as "primary assets," and connecting assets may be referred to as "secondary assets."

Aerial imagery may include photographic images of the ground taken from an elevated position. Aerial images may be acquired via aerial camera systems that are not supported by ground based structures, such as cameras in satellites, aircraft (e.g., planes, helicopters, drones, balloons, blimps, etc.), or the like. In some instances, individual aerial images of smaller areas can be combined to generate an aerial image of a large area. For example, one-hundred substantially square, 2-D aerial images that depict areas of about 1 km (kilometer)×1 km can be combined to construct an aerial image (e.g., a map) of an area that is approximately 100 km$^2$. Such aerial image coverage can be used to provide maps, such as the satellite image views provided by Google Maps®.

In some embodiments, aerial images may be used to identify the locations of infrastructure assets. For example, aerial images may be used to identify the location of energy infrastructure assets, such as towers supporting high-tension power lines, and the power lines themselves. In some embodiments, an asset identification training module uses images of areas known to include assets (and images of areas known to not include assets) to generate an aerial image processing model that can be used by an asset identification module to locate assets depicted in aerial images. In some embodiments, known asset locations are used to focus the search for other assets. For example, where locations of two assets are known, the aerial images of an area between the assets can be searched to identify the location of other assets. For example, aerial images of the area between a power station and a nearby high-tension power line tower may be accessed in an effort to locate power lines extending between the power station and the tower, or to locate other towers between the power station and the tower.

In one embodiment, the asset identification training module and the asset identification module can be any one of a number of known feature detectors, such as SURF, SIFT or FAST. When acting as the asset identification training module, the feature detector is trained to identify relevant assets using training data consisting of both images known to contain assets and images known not to contain assets. In operation, the feature detector uses the training data to identify features of known assets that allow the feature detector to discriminate images with assets from images without assets. The feature detector thereby generates an asset feature model (referred to herein as an aerial image processing model) for identifying relevant assets. When acting as the asset identification module, the feature detector uses the asset feature model (aerial image processing model) to identify relevant assets in non-training data images that may or may not contain relevant assets. In some instances, models can be created for identifying certain types of assets. For example, primary and secondary asset aerial image processing models can be generated for use in identifying primary assets and secondary assets, respectively, in aerial images. In some instances, models can be created for identifying specific types of assets. For example, in the context of an electrical grid infrastructure, power line, power pole/tower, electrical switching station, and power generation facility aerial image processing models can be generated for use in identifying power lines (e.g., high-tension power lines), power poles/towers supporting power lines, electrical switching stations, and power generation facilities, respectively, in aerial images.

Although certain embodiments are described with regard to particular types of infrastructures, such as an electrical grid infrastructure, the same or similar techniques may be employed for any variety of infrastructures, including transportation infrastructures, other energy infrastructures, communications infrastructures, natural resource transportation infrastructures, and so forth. For example, embodiments described in the context of locating power lines between power stations and towers can be employed in a similar manner for identifying railways between rail switching stations, or for locating pipelines between processing plants and pumping stations.

FIG. 1 is a block diagram that illustrates an infrastructure asset identification system ("system") 100 in accordance with one or more embodiments of the present invention. In the illustrated embodiment, system 100 includes an asset identification training module ("training module") 102, a primary asset identification module 104, a secondary asset identification module 106, asset data 108 (e.g., stored in an asset information database), and images 110 (e.g., stored in an image database).

Asset data 108 may include information about various infrastructure assets. In some embodiments, asset data 108 includes asset datasets for individual assets of an infrastructure. For example, asset data 108 for an electrical grid infrastructure may include, asset datasets for each of the infrastructure's power lines (e.g., high-tension power lines), power poles/towers, electrical switching stations, power generation facilities (e.g., power plants), and the like that have been identified. An asset dataset may include information about the asset, such as a name/identifier, an asset type, and/or an asset location. For example, an asset dataset for an electrical switching station ("ESS") may include the following: [1234; ESS; L1], where 1234 is the asset identifier, ESS is the asset type, and L1 is the asset location. Asset datasets for high-tension power line towers ("HTPLT") may include the following: [1235; HTPLT; L2] and [1236; HTPLT; L3], respectively. In some embodiments, the location information may include a geographic location and/or an area where the asset is located. For example, L1 may include a set of geographic coordinates indicating a point where the asset is located, and/or an identifier of a geographic cell/tile in which a center of the asset is located. In some embodiments, the location information may indicate a boundary of an asset. For example, L1 may define a boundary of the electrical switching station, and/or one more geographic tiles that include at least a portion of the switching station (e.g., at least a portion of the cell/tile falls within the boundary).

Images 110 may include aerial images of the ground (e.g., the earth's surface). Individual images 110 may include photographic images of a given area. Images 110 may be associated with a location/area that they represent. For example, an image may be associated with geographic coordinates at a centroid of the image, the boundaries of the image (e.g., four geographic coordinates at the corners of a square image), or the like.

In some embodiments, aerial images may be used to identify the locations of infrastructure assets. For example, images 110 may be used to identify the location of electrical grid infrastructure terminal assets, such as towers supporting high-tension power lines, and electrical grid infrastructure connecting assets, such as the power lines. In some embodiments, a training module 102 uses aerial images of locations known to include assets (and images of locations known to not include assets) to generate an aerial image processing model that can be used by asset identification modules 104 and 106 to identify the locations of assets, respectively, using other images 110 (e.g., candidate images). As noted above, in some embodiments, the training module 102 and asset identification modules 104 and 106 can be implemented using a known feature detector such as FAST, SURF or SIFT.

Figure 2:
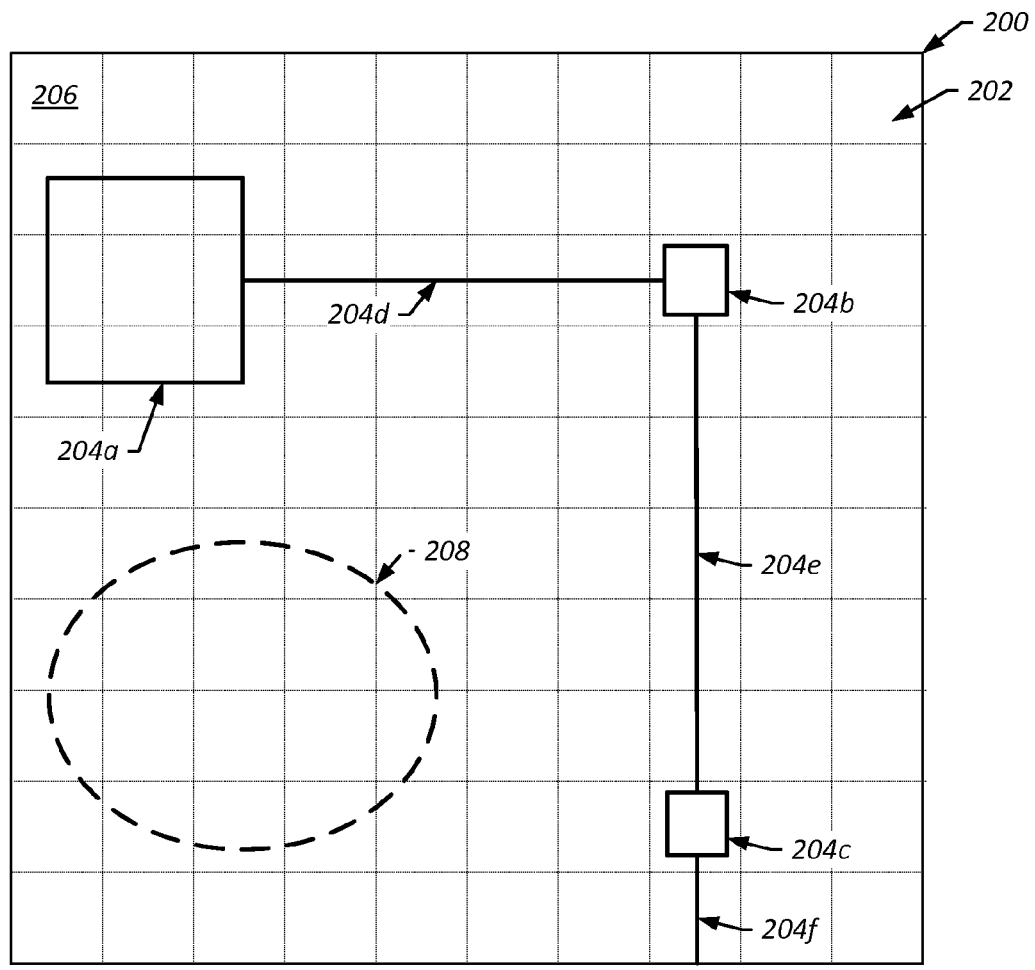
FIG. 2 is a diagram that illustrates exemplary aerial imagery of a region including infrastructure assets in accordance with one or more embodiments of the present invention.

FIG. 2 is a diagram that illustrates an exemplary aerial image 200 of a region 202 including infrastructure assets 204 (e.g., assets 204a-204f). In the illustrated embodiment, aerial image 200 is constructed of one-hundred individual aerial images 206 that each depicts a respective sub region of region 202. Although image 200 is composed of one-hundred individual square images 206 for the purpose of illustration, embodiments may include aerial images composed of any number of individual images of any variety of shapes and sizes. Assets 204 may include any variety of infrastructure assets that have been identified, or that may be identified using the techniques described herein. For example, asset 204a may be an electrical switching station (ESS), assets 204b and 204c may each be high-tension power line towers (HTPLT's), and assets 204d-204f may be high-tension power lines (HTPL's). As discussed herein, region 208 may include an area that does not include any assets.

Figure 3:
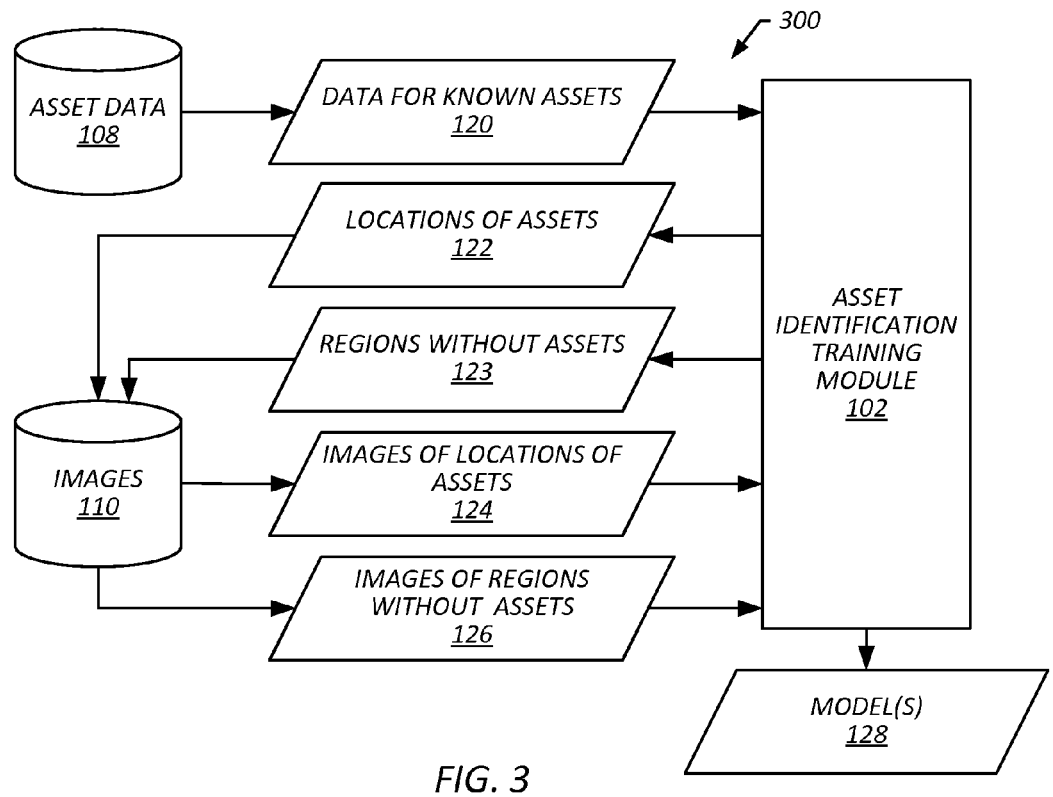
FIG. 3 is a block diagram that illustrates an exemplary asset identification training system in accordance with one or more embodiments of the present invention.
Figure 4:
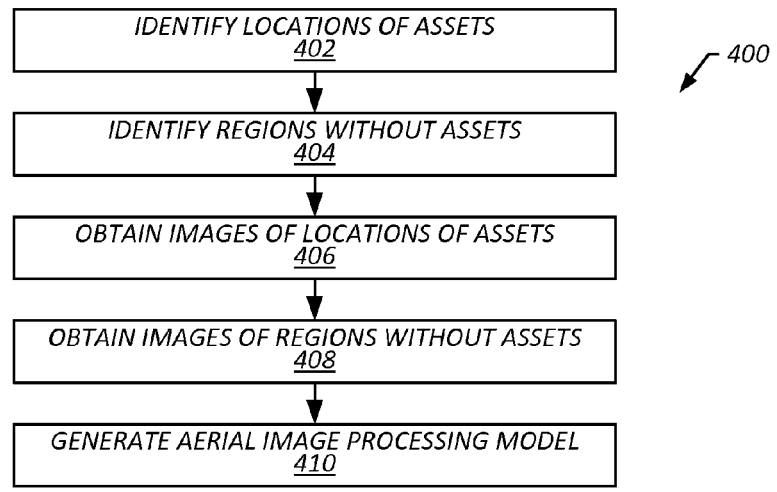
FIG. 4 is a flowchart that illustrates a method of asset identification training in accordance with one or more embodiments of the present invention.

FIG. 3 is a block diagram that illustrates an exemplary asset identification training system 300. FIG. 4 is a flowchart that illustrates an exemplary method 400 of asset identification training. Method 400 may include identifying locations of assets (block 402) and identifying regions without assets (block 404). In some embodiments, identifying locations of assets includes training module 102 querying an asset information database for data relating known asset locations, and the database returning corresponding data for assets 120. For example, where location of assets 204a and 204b are known, the database may return the datasets [1234; ESS; L1] and [1235; HTPLT; L2] corresponding to assets 204a and 204b, respectively. Training module 102 may extract the location information to identify known locations of assets 122. For example, training module 102 may identify locations L1 and L2 based on the received datasets. In some instances, the regions without assets 123 may be determined by training module 102 based on data for assets 120 (e.g., by identifying regions without assets located therein), or the regions may be predefined (e.g., training module 102 may have access to a predefined list of regions without assets located therein). In an exemplary embodiment, regions without assets 123 may include region 208 (i.e., an area known to not include any assets).

Method 400 may include obtaining images of locations of assets (block 406) and obtaining images of regions without assets (e.g., block 408). In some embodiments, shown in FIG. 3, obtaining images of locations of assets includes training module 102 querying an image database for images that include the locations of assets 122 and images of regions without assets 123, and the image database returning images of the locations of assets 124 and images of the regions without assets 126. Images of locations of assets 124 may include images of regions that include a point (e.g., a centroid of the asset) or at least a portion of the area/bounds associated with the asset. For example, images of locations of assets 124 may include the nine images 206 of FIG. 2 that include at least a portion of the switching station (asset 204a) and the image 206 that includes the tower (asset 204b). Images of regions without assets 126 may include images of regions that are completely contained within the area/bounds associated with the regions without assets 123. For example, images of regions without assets 126 may include the six images 206 of FIG. 2 that are completely contained within region 208.

Method 400 may include generating an aerial image processing model (block 410). In some embodiments, one or more aerial image processing models ("model(s)") 128 are generated using images of locations of assets 124 and/or images of regions without assets 126. For example, at least some of the images of locations of assets 124 may be assessed to identify features or characteristics of images that include infrastructure assets, and at least some of the images of regions without assets 126 may be assessed to identify features or characteristics of images that do not include infrastructure assets. In some instances, additional contextual information may be used to refine the feature or aerial image processing model (i.e., model(s) 128). For example, images 124 and 126 may include additional contextual information about the respective images such as a time of day when the image was taken, a date when the image was taken, a source of the image (e.g., which satellite acquired the image), a position/angle of the camera when the image was taken (e.g., camera directly overhead), and so forth. Thus, the aerial image processing model may be based on the features or characteristics of aerial images with and without assets, taken under particular conditions or within particular contexts. As described herein, aerial image processing model(s) 128 can be used to determine whether images include assets, in addition to the type and/or locations of any assets identified. The images used for generating aerial image processing model(s) 128 may be referred to as the training corpus of images. In some embodiments, about 75% of each of images 124 and 126 in the training corpus of images are used for training. Thus, about 25% may not be used for training. The images in the training corpus that are not used for training may be reserved for verification of the aerial image processing model(s) 128, and may be referred to as the verification corpus of images.

In some embodiments, the verification corpus of images (i.e., the other 25% of the images that are not used for training) are subject to processing by the asset identification training module 102 using the aerial image processing model(s) 128. The outcome of the verification can be used to determine whether the aerial image processing model(s) 128 can be used to reliably identify the locations and/or types of assets depicted in aerial images. In some instances, the model(s) 128 may be used/verified if it meets a predetermined confidence threshold. If, for example, a threshold is 90%, and the asset identification training module 102 can use the aerial image processing model(s) 128 to correctly identify the locations and/or types of infrastructure assets depicted in the verification corpus of images at least 90% of the time, the aerial image processing model(s) 128 may be verified for use.

In some embodiments, aerial image processing models are generated for particular contexts. For example, in the embodiment discussed above, aerial image processing model(s) 128 may be an electrical grid infrastructure asset identification model that is generated based on the features (characteristics) of images that are known to contain the locations of electrical grid infrastructure assets. Other image processing models can be generated in a similar manner. For example, a transportation infrastructure asset identification model (e.g., a railroad infrastructure system model) can be generated based on features extracted from images known to contain locations of transportation infrastructure assets, a communications infrastructure asset identification model (e.g., a telephone communication system infrastructure model) can be generated based on features extracted from images known to contain locations of communications infrastructure assets, a natural resource transportation asset identification model (e.g., an oil and gas pipeline infrastructure model) can be generated based on features extracted from images known to contain locations of natural resource transportation infrastructure assets, and so forth.

In some instances, different aerial image processing models can be created for identifying certain types of assets. For example, model(s) 128 may include primary and secondary asset aerial image processing models for use in identifying primary assets and secondary assets, respectively, in aerial images. In some instances, different aerial image processing models can be created for identifying specific types of assets. For example, in the context of an electrical grid infrastructure, model(s) 128 may include power line, power pole/tower, electrical switching station, and power generation facility aerial image processing models for use in identifying power lines (e.g., high-tension power lines), power poles/towers supporting power lines, electrical switching stations, and power generation facilities, respectively, in aerial images.

Figure 5:
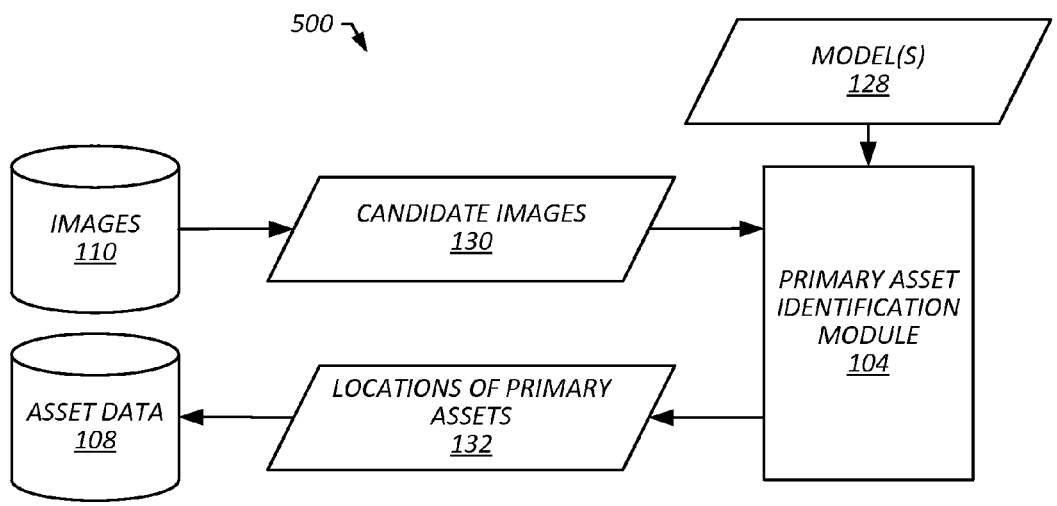
FIG. 5 is a block diagram that illustrates an exemplary primary asset identification system in accordance with one or more embodiments of the present invention.
Figure 6:
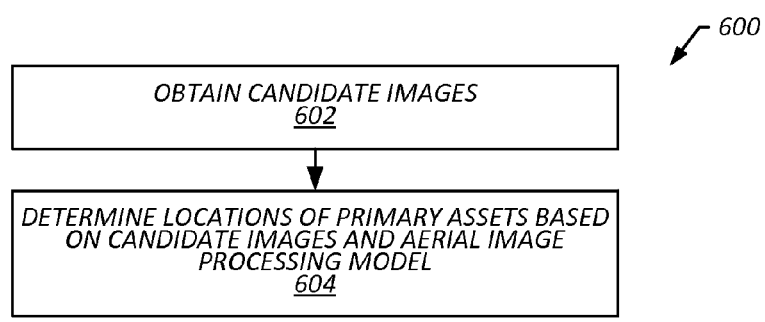
FIG. 6 is a flowchart that illustrates a method of locating primary assets in accordance with one or more embodiments of the present invention.

FIG. 5 is a block diagram that illustrates an exemplary primary asset identification system 500. FIG. 6 is a flowchart that illustrates an exemplary method 600 of locating primary assets. Method 600 may include obtaining candidate images 602 (block 602). In some embodiments, shown in FIG. 5, obtaining candidate images includes primary asset identification module 104 querying the image database for candidate images 130, and the image database providing candidate images 130. Candidate images 130 may be processed by primary asset identification module 104 using feature or aerial image processing model(s) 128 to identify the locations of primary infrastructure assets. In some embodiments, candidate images may include sets of images that have not yet been processed to locate infrastructure assets. For example, where the 5×5 set of images 206 in the bottom, right-hand corner of region 202 of FIG. 2 have not been processed, candidate images 130 may include the twenty-five images 206 of the 5×5 set.

Method 600 may include determining locations of primary assets based on candidate images and the aerial image processing model (block 604). In some embodiments, determining locations of primary assets includes primary asset identification module 104 processing candidate images 130 using model(s) 128 to identify primary assets within the images, as well as the types and locations of the primary assets that are identified. For example, primary asset identification module 104 may identify asset 204c (i.e., the high-tension power line tower ("HTPLT") located at L3) as a result of processing the set of twenty-five images using model(s) 128. The location of primary assets may be provided to the asset database, and the asset data 108 may be updated accordingly. For example, in response to identifying the high-tension power line tower ("HTPLT") located at L3, primary asset identification module 104 may transmit the asset dataset "[1236; HTPLT; L3]" to the asset database, and asset data 108 may be updated to include the asset dataset.

As discussed above, the primary asset identification module 104 may be a known feature detector, such as FAST, SURF or SIFT. The feature detector may have been trained to identify primary assets based on the features of primary assets known to be located within a training corpus of images. The identified features of primary assets may be stored as one or more feature or aerial image processing model(s) 128. Using the image processing models 128, the feature detector can be run as a primary asset identification module by extracting features from a candidate image and comparing the extracted features to features in the aerial asset processing model that have been extracted from images known to contain primary assets. When the extracted features match the features in the aerial asset processing model (e.g., by satisfying some measure of similarity, such as a similarity above a threshold), the extracted features can be identified as belonging to a primary asset.

In some embodiments, particular model(s) 128 associated with the types of assets to be identified may be used. For example, primary asset identification module 104 may select and use model(s) 128 suited for use in identifying primary assets in candidate images 130. In the context of an electrical grid infrastructure, asset identification module 104 may use power pole/tower, electrical switching station, and power generation facility aerial image processing models for use in identifying power poles/towers supporting power lines, electrical switching stations, and power generation facilities, respectively, in candidate images 130.

In some embodiments, the candidate images are processed using an aerial image processing model(s) 128 that is selected based on the contextual information associated with the image. For example, when processing an image 206 that is associated with contextual information indicating that it was taken at 9:00 am, Dec. 12, 2012, from satellite camera "ABC", from a position directly overhead, the primary asset identification module may select an aerial image processing model(s) 128 having features or characteristics that have been extracted from training data images (e.g., images 124 and 126) that were associated with a similar context (i.e., taken at a similar date and time of day, from the same or similar camera, and the same or similar position). Processing of each of the individual candidate images may use the image's context in a similar manner to select an aerial image processing model(s) 128 appropriate for the candidate image.

Figure 7:
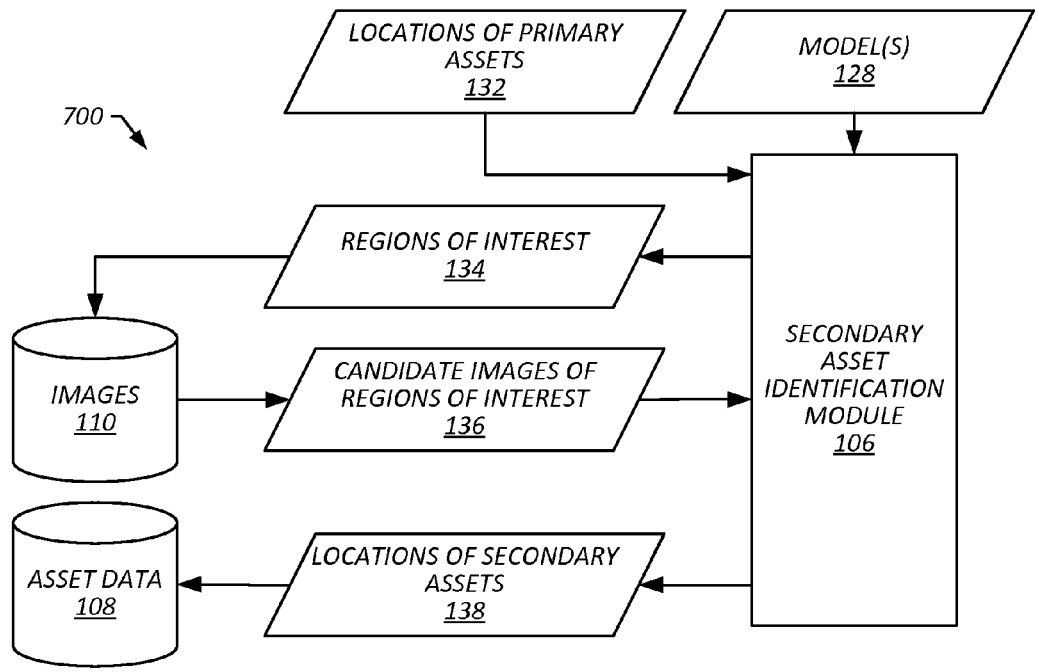
FIG. 7 is a block diagram that illustrates an exemplary secondary asset identification system in accordance with one or more embodiments of the present invention.
Figure 8:
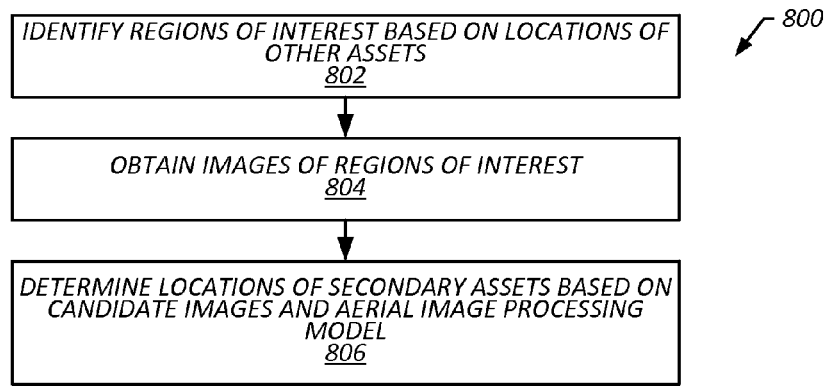
FIG. 8 is a flowchart that illustrates a method of locating secondary assets in accordance with one or more embodiments of the present invention.

FIG. 7 is a block diagram that illustrates an exemplary secondary asset identification system 700. FIG. 8 is a flowchart that illustrates an exemplary method 800 of locating secondary assets. Method 800 may include identifying regions of interest based on locations of assets (block 802). In some embodiments, identifying regions of interest includes secondary asset identification module 106 identifying regions of interest 134 based on locations of primary assets 132. For example, a region of interest may be defined as a region that extends a given distance (e.g., thirty kilometers) on either side of a line that extends between two assets. Such a region of interest may define an area where it is likely to find secondary assets (e.g., power lines that extend between primary assets).

Figure 9A:
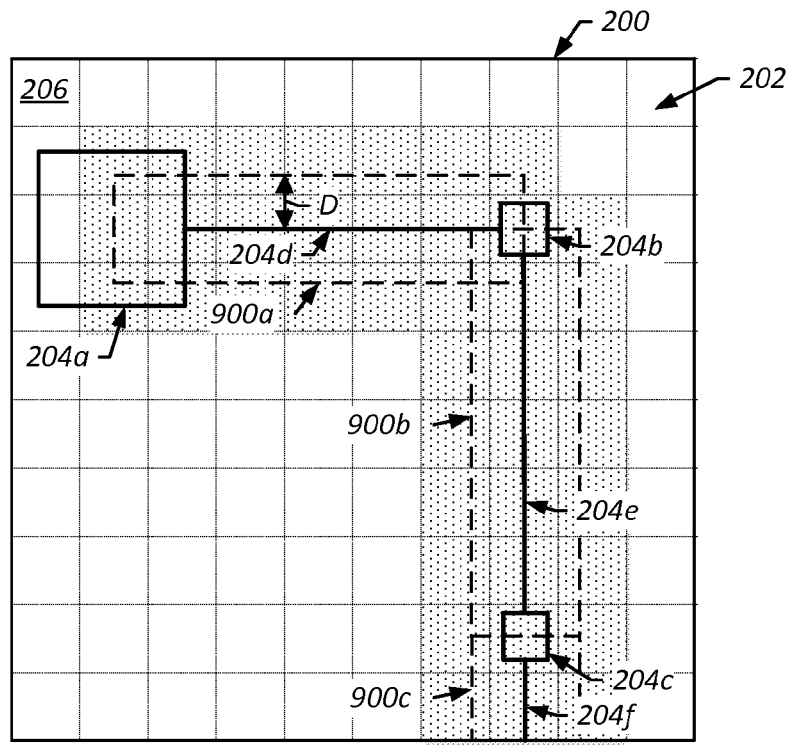
FIGS. 9A and 9B are diagrams that illustrate exemplary regions of interest in accordance with one or more embodiments of the present invention.
Figure 9B:
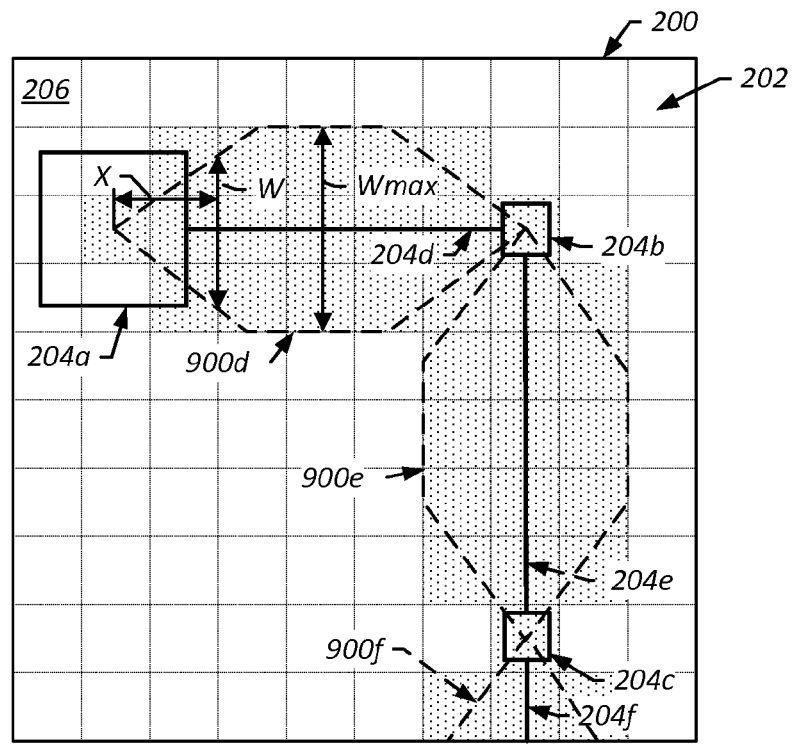

FIGS. 9A and 9B are diagrams that illustrate exemplary regions of interest 900a-900f. Regions of interest 900a-900f may be identified based on the known locations of assets 204a, 204b and 204c. In the embodiment of FIG. 9A, the regions of interest (ROIs) 900a-900c include rectangular regions that extend between primary assets. For example, ROI 900a includes a region that extends a given distance "D" on either side of a straight line that extends between the centers of assets 204a and 204b. ROI 900b includes a region that extends a given distance "D" on either side of a straight line that extends between the centers of assets 204b and 204c. ROI 900c includes a region that extends a given distance "D" on either side of a straight line that extends between the centers of asset 204c and another asset (not shown).

In some embodiments, the shape and/or size of a ROI can vary (e.g., based on a distance from an asset location). For example, a ROI may have a fan-shape, increasing in size/width at distances farther from an asset. Such an expansion of the ROI may account for the various directions connecting assets may take as they extend from a terminal asset. For example, an ROI that increases in size as it extends away from an asset, such as an electrical switching station, may encompass an area in which a power line may turn, or otherwise not follow a straight path in route to an adjacent terminal. In the embodiment of FIG. 9B, the regions of interest (ROIs) 900d-900f include hexagonal regions that extend between primary assets. For example, ROI 900d includes a region that extends between the centers of assets 204a and 204b. ROI 900e includes a region that extends between the centers of assets 204b and 204c. ROI 900f includes a region that extends between the centers of asset 204c and another asset (not shown). In some embodiments, a width ("W") of the ROI increases at distances farther from the location of the assets. For example, a width (W) of ROI 900d may increase proportional to a distance ("X") from the location of nearest asset (e.g., asset 204a or asset 204b). In some embodiment, a width of the ROI may be limited. For example, the width W may be limited to a maximum width ("Wmax").

Method 800 may include obtaining images of the regions of interest (block 804). In some embodiments, shown in FIG. 7, obtaining images of the regions of interest includes secondary asset identification module 106 querying the image database for candidate images that correspond to the regions of interest 134, and the image database providing candidate images of the regions of interest 136. In some embodiments, candidate images of the regions of interest 136 include images 110 having at least a portion of the area they depict falling within one of the regions of interest. For example, candidate images 136 may include the shaded images 206 of FIG. 9A (i.e., the twenty-one images 206 that fall at least partially within ROI 900a, the twenty-one images 206 that fall at least partially within ROI 900b, and at least the six images 206 that fall at least partially within the depicted portion of ROI 900c). Or, for example, candidate images 136 may include the shaded images 206 of FIG. 9B (i.e., the seventeen images 206 that fall at least partially within ROI 900d, the seventeen images 206 that fall at least partially within ROI 900e, and at least the four images 206 that fall at least partially within the depicted portion of ROI 900f).

Method 800 may include determining locations of secondary assets based on the candidate images (block 806). In some embodiments, determining locations of secondary assets includes secondary asset identification module 106 processing candidate images 136 using aerial asset identification model(s) 128 to identify assets located within (or near) the regions of interest, as well as the type and locations of the assets identified. For example, secondary asset identification module 106 may process the twenty-one images associated with ROI 900a (using model(s) 128) to identify asset 204d, the high-tension power lines (HTPLs) located at L4, extending between the electric switching station (asset 204a) and the high-tension power line tower (asset 204b). Similarly, secondary asset identification module 106 may process the twenty-one images associated with ROI 900b (using model(s) 128) to identify asset 204e, the high-tension power lines (HTPLs) located at L5, extending between the two high-tension power line tower (assets 204b and 204c). Further, secondary asset identification module 106 may process the images associated with ROI 900c (using model (s) 128) to identify asset 204f, the high-tension power lines (HTPLs) located at L6, extending from high-tension power line tower (asset 204c) to another asset (not shown). The location of secondary assets may be provided to the asset database, and the asset data 108 may be updated accordingly. For example, in response to identifying the high-tension power lines located at L4, L5, and L6, secondary asset identification module 106 may transmit the following asset datasets to the asset database: "[1237; HTPL; L4]," "[1238; HTPL; L5]," and "[1239; HTPL; L6]." Asset data 108 may be updated to include the asset datasets.

In some embodiments, the processing of images to identify secondary assets may be assisted by information about the context of the ROI. The context may include, for example, a type of infrastructure associated with the ROI. For example, where ROI's 900a, 900b and 900c are associated with an electrical grid infrastructure, secondary asset identification module 106 may select and use an electrical grid infrastructure asset identification model suited for identifying electrical infrastructure assets. If for example, the assets used to identify the ROI were transportation infrastructure assets (e.g., railroad switching stations), communications infrastructure assets (e.g., telephone poles/towers or telephone switching stations), natural resource transportation assets (e.g., pumping/processing stations), secondary asset identification module 106 may select and use a respective transportation infrastructure asset identification model, communications infrastructure asset identification model, or natural resource transportation model that is suited for the particular context.

In some embodiments, particular model(s) 128 associated with the types of assets to be identified may be used. For example, secondary asset identification module 106 may use model(s) 128 suited for use in identifying secondary assets in candidate images 130. In the context of an electrical grid infrastructure, for example, secondary asset identification module 106 may use a power line aerial image processing model for use in identifying power lines (e.g., high-tension power lines) in candidate images 130. In some embodiments, secondary asset identification module may use models for identifying both primary and secondary assets such that candidate images of the regions of interest are searched for both primary and secondary assets. For example, secondary asset identification module 104 may select and use model(s) 128 suited for use in identifying primary or secondary assets in candidate images 130. In the context of an electrical grid infrastructure, for example, asset identification module 104 may use power line, power pole/tower, electrical switching station, and power generation facility aerial image processing models for use in identifying power lines (e.g., high-tension power lines), power poles/towers supporting power lines, electrical switching stations, and power generation facilities, respectively, in candidate images 130. By searching images of ROI's using the various models that are available (including primary asset models), there is a potential to locate additional primary assets between previously identified assets. For example, additional power poles may be located in images of an ROI that extends between the location of two power poles that were previously identified.

The processing of the images to identify secondary assets may be assisted by information about the type of infrastructure assets associated with the ROI. In some embodiments, where an ROI is defined based on primary assets, the processing of images includes biasing the aerial image processing model to search for corresponding secondary assets, primary assets or other assets, that are typically found in regions between the primary assets. For example, where ROI 900a is defined based on primary assets that include a switching station and a high-tension power line tower, model(s) 128 may be biased to search for power lines, or power poles/towers that are typically found between switching stations and high-tension power line towers. Similarly, where ROI 900b is defined based on primary assets that include two high-tension power line towers, model(s) 128 may be biased to search for secondary assets (e.g., such as power lines), or other assets (e.g., power poles/towers) that are typically found in regions between high-tension power line towers.

In some embodiments, the images associated with the region of interest are processed based on contextual information associated with the image. For example, when one of the twenty-one images of ROI 900a is being processed, and the image is associated with contextual information that indicates it was taken at 9:00 am, Dec. 12, 2012, from satellite camera "ABC", from a position directly overhead, secondary asset identification module 106 may use feature or aerial asset identification model(s) 128 having features or characteristics that were extracted from training images (e.g., images 124 and 126) that were associated with a similar context (i.e., taken at a similar date and time of day, from the same or similar camera, and the same or similar position). Processing of each of the individual images associated with the ROI's may use the context of the image in a similar manner to select an appropriate aerial asset identification model.

In some embodiments, processing of the images to identify secondary assets includes employing one or more image processing techniques. For example, twenty-one images associated with ROI 900a may be combined to generate a single image for the region, and edge-detection may be performed on the image to identify power lines (e.g., assets 204d), or similar assets that appear as a line in an aerial image. In some embodiments, processing may include use of a Fast Fourier Transform (FFT). For example, the image for the region associated with ROI 900a may be subjected to an FFT to generate a corresponding transform of the image in the frequency domain. The resulting FFT data can be assessed to identify high-frequency (i.e., high contrast) components that correspond to an asset (e.g., a power line) extending across the ROI.

Accordingly, in some embodiments, asset identification training module 102 uses images of known locations of assets (and images of locations known to not include assets) to generate a feature or aerial image processing model(s) 128. The model(s) 128 can then be used by asset identification modules (e.g. a primary asset identification module 104 and a secondary asset identification module 106) to locate assets in aerial images. In some embodiments, the primary asset identification module uses model(s) 128 to identify the location of primary assets using sets of candidate images. For example, a region may be assessed to identify locations of primary assets, such as railroad switching stations, towers supporting power lines, electrical switching stations, power generation facilities, and so forth. In some embodiments, the location of assets may be used to define regions of interest that can be searched for other primary assets or secondary assets. For example, the areas between two primary assets may be identified as a region of interest, and a set of images that correspond to the region of interest can be processed (e.g., searched) to identify the locations of additional primary assets or any secondary assets that appear in the set of images. Thus, training can be used to develop feature or asset identification models that can be used to identify assets and their locations within images, and the locations of the assets can be used to identify images in regions of interest that are subsequently searched using the same or different asset identification models to identify additional primary or secondary assets.

It will be appreciated that methods 400, 600 and 800 are exemplary embodiments of methods that may be employed in accordance with the techniques described herein. Methods 400, 600 and 800 may be modified to facilitate various implementations and uses. Methods 400, 600 and 800 may be implemented in software, hardware, or a combination thereof. Some or all of methods 400, 600 and 800 may be implemented by one or more of the modules/applications described herein, such as asset identification training module 102, primary asset identification module 104, and secondary asset identification module 106. The order of the steps of methods 400, 600 and 800 may be changed, and various elements may be added, reordered, combined, omitted, modified, etc.

Exemplary Computer System

Figure 10:
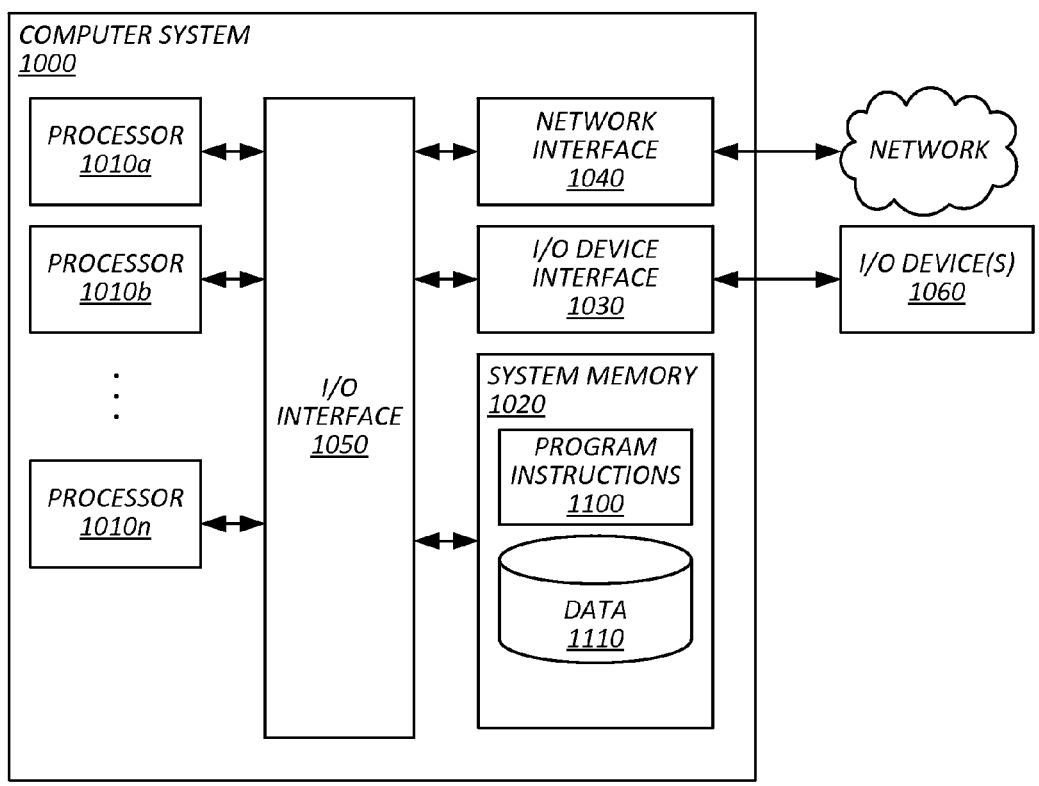
FIG. 10 is a block diagram that illustrates an exemplary computer system in accordance with one or more embodiments of the present invention.

FIG. 10 is a block diagram that illustrates an exemplary computer system 1000. Various portions of systems and methods described herein, may include or be executed on one or more computer systems similar to system 1000. For example, system 100 may have a configuration similar to at least a portion of computer system 1000.

Computer system 1000 may include one or more processors (e.g., processors 1010a-1010n) coupled to system memory 1020, an input/output I/O device interface 1030 and a network interface 1040 via an input/output (I/O) interface 1050. A processor may include a single processor device and/or a plurality of processor devices (e.g., distributed processors). A processor may be any suitable processor capable of executing/performing instructions. A processor may include a central processing unit (CPU) that carries out program instructions to perform the basic arithmetical, logical, and input/output operations of computer system 1000. A processor may include code (e.g., processor firmware, a protocol stack, a database management system, an operating system, or a combination thereof) that creates an execution environment for program instructions. A processor may include a programmable processor. A processor may include general and/or special purpose microprocessors. A processor may receive instructions and data from a memory (e.g., system memory 1020). Computer system 1000 may be a uni-processor system including one processor (e.g., processor 1010a), or a multi-processor system including any number of suitable processors (e.g., 1010a-1010n). Multiple processors may be employed to provide for parallel and/or sequential execution of one or more portions of the techniques described herein. Processes and logic flows described herein may be performed by one or more programmable processors executing one or more computer programs to perform functions by operating on input data and generating corresponding output. Processes and logic flows described herein may be performed by, and apparatus can also be implemented as, special purpose logic circuitry, e.g., an FPGA (field programmable gate array) or an ASIC (application specific integrated circuit). Computer system 1000 may include a computer system employing a plurality of computer systems (e.g., distributed computer systems) to implement various processing functions.

I/O device interface 1030 may provide an interface for connection of one or more I/O devices 1060 to computer system 1000. I/O devices may include any device that provides for receiving input (e.g., from a user) and/or providing output (e.g., to a user). I/O devices 1060 may include, for example, graphical user interface displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area (WAN), a cellular communications network or the like.

System memory 1020 may be configured to store program instructions 1100 and/or data 1110. Program instructions 1100 may be executable by a processor (e.g., one or more of processors 1010a-1010n) to implement one or more embodiments of the present technique. Instructions 1100 may include modules of computer program instructions for implementing one or more techniques described herein with regard to various processing modules. Program instructions may include a computer program (also known as a program, software, software application, script, or code). A computer program may be written in any form of programming language, including compiled or interpreted languages, or declarative/procedural languages. A computer program may include a unit suitable for use in a computing environment, including as a stand-alone program, a module, a component, a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier. A tangible program carrier may include a propagated signal and/or a non-transitory computer readable storage medium. A propagated signal may include an artificially generated signal (e.g., a machine generated electrical, optical, or electromagnetic signal) having encoded information embedded therein. The propagated signal may be transmitted by a suitable transmitter device to and/or received by a suitable receiver device. A non-transitory computer readable storage medium may include a machine readable storage device, a machine readable storage substrate, a memory device, or any combination thereof, or the like. Non-transitory computer readable storage medium may include, non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium having program instructions stored thereon that are executable by a computer processor (e.g., one or more of processors 1010a-1010n) to cause some or all of the subject matter and the functional operations described herein. A memory (e.g., system memory 1020) may include a single memory device and/or a plurality of memory devices (e.g., distributed memory devices).

I/O interface 1050 may be configured to coordinate I/O traffic between processors 1010a-1010n, system memory 1020, network interface 1040, I/O devices 1060 and/or other peripheral devices. I/O interface 1050 may perform protocol, timing or other data transformations to convert data signals from one component (e.g., system memory 3020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000, or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices and/or software that may perform or otherwise provide for the performance of the techniques described herein. For example, computer system 1000 may include a desktop computer, a laptop computer, a tablet computer, a server device, a client device, a mobile telephone, a personal digital assistant (PDA), a mobile audio or video player, a game console, a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" may include a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A computer-implemented method for identifying locations of infrastructure assets, the method comprising:
    determining, by one or more processors, geographic locations of a plurality of infrastructure assets, including:
        querying, by the one or more processors, an asset information database for data for known asset locations, and
        receiving, by the one or more processors from the asset information database, a respective dataset for each of the plurality of infrastructure assets, including receiving an asset identifier, an indication of an asset type and an indication of an asset location as part of the dataset, wherein the indication of the asset location includes at least one of (i) geographic coordinates indicating a point where the asset is located, (ii) an identifier of a cell in which a center of the asset is located, or a (iii) an indication of a boundary of the asset;
    determining, by one or more processors, a plurality of geographic regions that do not contain any infrastructure assets;
    obtaining, by the one or more processors, first images of the geographic locations of the plurality of infrastructure assets and second images of the plurality of geographic regions that do not include any infrastructure assets;
    generating, by the one or more processors, an image processing model using the first images and the second images, including identifying first features of the first images and second features of the second images, and training the image processing model using the first features and the second features;
    receiving, by one or more processors, a candidate image; and
    using the image processing model, automatically locating an infrastructure asset within the candidate image.

2. The computer-implemented method of claim 1, wherein generating the image processing model includes applying context data related to the first and second images, the context data indicating, for each image, at least one of (i) a time of day when the image was acquired, (ii) a date when the image was acquired, (iii) a source of the image, or (iv) a position and angle of a camera used to acquire the image.

3. The computer-implemented method of claim 1, wherein first images and the second images define a training corpus of images; the method further comprising:
    obtaining, by the one or more processors, a verification corpus of images including third images of geographic locations including infrastructure assets and fourth images of geographic regions that do not include any infrastructure assets;

applying, by the one or more processors, the verification corpus to the image processing model to generate a metric; and comparing, by the one or more processors, the metric to a predetermined confidence threshold to determine whether the image processing model can be used for subsequent image processing.

4. The computer-implemented method of claim 1, wherein generating the image processing model includes generating the image processing model for a single specific type of infrastructure assets, wherein obtaining the first images includes querying an asset information database for the specific type of infrastructure assets.

5. The computer-implemented method of claim 1, wherein identifying the first features and the second features includes using one of FAST, SURF or SIFT feature detecting techniques.

6. A system comprising:
one or more processors;
an asset information database storing information regarding infrastructure assets;
one or more memory devices storing program instructions that, when executed by the one or more processors, cause the system to perform the following:
determining geographic locations of a plurality of infrastructure assets, including:
querying the asset information database for data for known asset locations, and
receiving, from the asset information database, a respective dataset for each of the plurality of infrastructure assets, including receiving an asset identifier, an indication of an asset type and an indication of an asset location as part of the dataset, wherein the indication of the asset location includes at least one of (i) geographic coordinates indicating a point where the asset is located, (ii) an identifier of a cell in which a center of the asset is located, or a (iii) an indication of a boundary of the asset,
determining a plurality of geographic regions that do not contain any infrastructure assets,
obtaining first images of the geographic locations of the plurality of infrastructure assets and second images of the plurality of geographic regions that do not include any infrastructure assets,
generating an image processing model using the first images and the second images, including identifying first features of the first images and second features of the second images, and training the image processing model using the first features and the second features,
receiving a candidate image, and
using the image processing model, automatically locating an infrastructure asset within the candidate image.

7. The system of claim 6, wherein generating the image processing model includes applying context data related to the first and second images, the context data indicating, for each image, at least one of (i) a time of day when the image was acquired, (ii) a date when the image was acquired, (iii) a source of the image, or (iv) a position and angle of a camera used to acquire the image.

8. The system of claim 6, wherein first images and the second images define a training corpus of images; wherein the instructions further cause the system to perform the following:
obtaining a verification corpus of images including third images of geographic locations including infrastructure assets and fourth images of geographic regions that do not include any infrastructure assets;
applying the verification corpus to the image processing model to generate a metric; and
comparing the metric to a predetermined confidence threshold to determine whether the image processing model can be used for subsequent image processing.

9. The system of claim 6, wherein generating the image processing model includes generating the image processing model for a single specific type of infrastructure assets, wherein obtaining the first images includes querying an asset information database for the specific type of infrastructure assets.

10. The system of claim 6, wherein identifying the first features and the second features includes using one of FAST, SURF or SIFT feature detecting techniques.

11. A non-transitory computer-readable medium comprising program instructions stored thereon that are executable by a processors to cause the following steps operable to identify locations of infrastructure assets:
determining geographic locations of a plurality of infrastructure assets, including:
querying an asset information database for data for known asset locations, and
receiving, from the asset information database, a respective dataset for each of the plurality of infrastructure assets, including receiving an asset identifier, an indication of an asset type and an indication of an asset location as part of the dataset, wherein the indication of the asset location includes at least one of (i) geographic coordinates indicating a point where the asset is located, (ii) an identifier of a cell in which a center of the asset is located, or a (iii) an indication of a boundary of the asset;
determining a plurality of geographic regions that do not contain any infrastructure assets;
obtaining first images of the geographic locations of the plurality of infrastructure assets and second images of the plurality of geographic regions that do not include any infrastructure assets;
generating an image processing model using the first images and the second images, including identifying first features of the first images and second features of the second images, and training the image processing model using the first features and the second features;
receiving a candidate image; and
using the image processing model, automatically locating an infrastructure asset within the candidate image.

12. The computer-readable medium of claim 11, wherein generating the image processing model includes applying context data related to the first and second images, the context data indicating, for each image, at least one of (i) a time of day when the image was acquired, (ii) a date when the image was acquired, (iii) a source of the image, or (iv) a position and angle of a camera used to acquire the image.

13. The computer-readable medium of claim 10, wherein first images and the second images define a training corpus of images, the steps further comprising:
obtaining a verification corpus of images including third images of geographic locations including infrastructure assets and fourth images of geographic regions that do not include any infrastructure assets;

applying the verification corpus to the image processing model to generate a metric; and comparing the metric to a predetermined confidence threshold to determine whether the image processing model can be used for subsequent image processing.

14. The computer-readable medium of claim 10, wherein generating the image processing model includes generating the image processing model for a single specific type of infrastructure assets, wherein obtaining the first images includes querying an asset information database for the specific type of infrastructure assets.

* * * * *